(12) United States Patent
Gibson et al.

(10) Patent No.: US 11,372,624 B2
(45) Date of Patent: Jun. 28, 2022

(54) SYSTEM FOR CREATING GRAPHICAL CONTENT

(71) Applicant: Google LLC, Mountain View, CA (US)

(72) Inventors: Zachary Gibson, Oakland, CA (US); Sara Maybanks Cambridge, San Francisco, CA (US); Travis Edward Collins, San Francisco, CA (US); Francisco Javier Perez Fernandez, San Francisco, CA (US); Omer Ben Ziv, Brooklyn, NY (US); Amr Gaber, San Francisco, CA (US); Scott Evan Hyndman, San Francisco, CA (US); Megan Christine Anderson, San Francisco, CA (US); Solender Chea, Brooklyn, NY (US); Alex Michael Sheehan, Brooklyn, NY (US); Taddeo Zacchini, Kensington, CA (US); Abhilash Kuduvalli, San Francisco, CA (US); Gaja Kristina Sidrys, Oakland, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/981,402

(22) PCT Filed: Aug. 10, 2018

(86) PCT No.: PCT/US2018/046283
§ 371 (c)(1),
(2) Date: Sep. 16, 2020

(87) PCT Pub. No.: WO2020/032976
PCT Pub. Date: Feb. 13, 2020

(65) Prior Publication Data
US 2021/0011690 A1 Jan. 14, 2021

(51) Int. Cl.
*G06F 8/34* (2018.01)
*G06F 8/33* (2018.01)
*G06F 8/38* (2018.01)

(52) U.S. Cl.
CPC .............. *G06F 8/34* (2013.01); *G06F 8/33* (2013.01); *G06F 8/38* (2013.01)

(58) Field of Classification Search
CPC .............. G06F 8/34; G06F 8/33; G06F 8/38
See application file for complete search history.

(56) References Cited

U.S. PATENT DOCUMENTS 6,075,531 A 6/2000 DeStefano
6,104,391 A 8/2000 Johnston, Jr. et al.
(Continued)

OTHER PUBLICATIONS

Bryan, "MacDrawPro 1.5 Complete" Windcrest/McGraw-Hill, 1994, 10 pages.
(Continued)

*Primary Examiner* — Phillip H Nguyen
(74) *Attorney, Agent, or Firm* — Fish & Richardson P.C.

(57) ABSTRACT

Methods, systems, and apparatus, including computer programs encoded on a computer storage medium, for obtaining a content theme that includes a set of visual components and accessing control panels of a design system. The control panels are configured to provide control functions for adjusting attributes of the components. The control panels receive a selection of a first component that is linked to at least a second component in the set of visual components. An attribute of the first component is adjusted in response to detecting user interaction with a control panel. The user interaction causes adjustment of an attribute of a second component based on the adjusting of the attribute of the first component because of the second component being linked to the first component. Graphical content is created for output
(Continued)

at a display based on the adjusted attributes of the first and second components.

20 Claims, 6 Drawing Sheets

(56) References Cited

U.S. PATENT DOCUMENTS

| | | | |
|---|---|---|---|
| 6,601,057 B1* | 7/2003 | Underwood | G06F 16/958 |
| | | | 715/207 |
| 6,731,310 B2 | 5/2004 | Croft et al. | |
| 10,733,754 B2* | 8/2020 | Dayanandan | G06F 8/35 |
| 2008/0092057 A1 | 4/2008 | Monson et al. | |
| 2008/0098031 A1* | 4/2008 | Ducharme | G06F 3/0481 |
| 2009/0327927 A1 | 12/2009 | De Leon et al. | |
| 2014/0245116 A1 | 8/2014 | Dangerfield et al. | |
| 2014/0255009 A1 | 8/2014 | Svendsen et al. | |
| 2014/0258101 A1 | 8/2014 | Svendsen et al. | |
| 2014/0258894 A1* | 9/2014 | Brown | G06F 8/38 |
| | | | 715/764 |
| 2014/0258968 A1* | 9/2014 | Brown | G06Q 10/06 |
| | | | 717/103 |
| 2015/0067559 A1 | 3/2015 | Missig et al. | |
| 2018/0226101 A1* | 8/2018 | Taylor | G11B 27/02 |
| 2018/0335940 A1* | 11/2018 | Beerana | G06F 8/38 |

OTHER PUBLICATIONS

PCT International Search Report and Written Opinion in International Application No. PCT/US2018/046283, dated Apr. 25, 2019, 15 pages.

Youtube.com [online], "Get Started with Material Theming—Noteworthy—The Journal Blog" Jun. 2018, retrieved on Sep. 16, 2020, retrieved from: URL <https://blog.usejournal.com/get-started-with-material-theming-e44ed7f85d47>, 11 pages.

Youtube.com [online], "Getting started with Material Theme Editor" May 2018, retrieved on Sep. 16, 2020, retrieved from: URL <https://www.youtube.com/watch?v=BLrgDg1c0 >, 15 pages.

PCT International Preliminary Report on Patentability in International Appln. No. PCT/US2018/046283, dated Feb. 25, 2021, 9 pages.

* cited by examiner

SYSTEM FOR CREATING GRAPHICAL CONTENT

CROSS-REFERENCE TO RELATED APPLICATION

This application is a National Stage Application under 35 U.S.C. § 371 and claims the benefit of International Application No. PCT/US2018/046283, filed Aug. 10, 2018. The disclosure of the foregoing application is hereby incorporated by reference in its entirety.

BACKGROUND

This specification relates to a system that includes component structures for generating graphical content.

Visual content can be created using various devices and systems. Some devices form a system that allows a designer to create images, text, and other visual content for rendering at a display of an electronic device. The systems can integrate program code to implement methods and elements that generate an example digital interface. Such methods and interfaces enable users to manipulate elements of the visual content to create a new user interface for output at an electronic device display. Existing systems may be modified to produce a more simplified human-machine interface.

SUMMARY

Methods, systems, and apparatus, including computer programs encoded on a computer storage medium, for obtaining a content theme that includes a set of visual components and accessing design control panels of a design system. The design control panels are configured to provide control functions for adjusting attributes of the components. The design control panels receive a selection of a first component that is linked to at least a second component in the set of visual components. An attribute of the first component is adjusted in response to detecting user interaction with a control panel. The user interaction causes adjustment of an attribute of a second component based on the adjusting of the attribute of the first component because of the second component being linked to the first component. Graphical content is created for output at a display based on the adjusted attributes of the first and second components.

One aspect of the subject matter described in this specification can be embodied in a computer-implemented method performed using a system that provides an interface for creating user-specified graphical content. The method includes, obtaining a content theme from among a plurality of predefined content themes stored at the system, wherein each predefined content theme includes a set of visual components; receiving, at the interface, input for accessing one or more control panels of the system, the one or more control panels each configured to provide control functions for adjusting attributes of the set of visual components in the content theme; and receiving, at the one or more control panels, a selection of a first component from among the set of visual components in the content theme.

The first component selected from among the set of visual components is linked to at least one second component in the set of visual components stored at the control system; and in response to detecting user interaction with the one or more control panels, adjusting a first visual attribute of the first component based on the control functions of the one or more control panels with which the user interaction occurred. The method further includes, causing an adjustment of a second visual attribute of a second component of the at least one second components linked to the first component based on the adjusting of the first visual attribute of the first component; and creating graphical content for output at a display of a device, wherein the graphical content is created based on the adjusted first visual attribute of the first component and the adjusted second visual attribute of the second component.

These and other implementations can each optionally include one or more of the following features. For example, in some implementations, the method further includes: generating an application interface for output at the display of the device, wherein the application interface comprises representations of the graphical content and is generated based on adjusted visual attributes of one or more components in the set of visual components in the system.

In some implementations, the method further includes, receiving a selection of a first control panel that provides control functions configured to adjust one or more visual attributes of the first component; and adjusting the one or more visual attributes of the first component in response to receiving an adjustment parameter after detecting user interaction with the first control panel that triggers the control functions of the first control panel.

In some implementations, the method further includes, receiving, at the first control panel, a selection of the second component to create the graphical content for output at the display of the device; and automatically adjusting the selected second component to have one or more visual attributes that match the adjusted one or more visual attributes of the first component, wherein the second component is automatically adjusted based on the second component being linked to the first component.

In some implementations, the method further includes, receiving, at the first control panel, a selection of the second component to create the graphical content for output at the display of the device; and automatically adjusting the selected second component in a manner that is unique to the second component based on the adjusted one or more visual attributes of the first component, wherein the second component is automatically adjusted based on the second component being linked to the first component.

In some implementations, the method further includes, receiving, at the system, a selection of an override configured to modify a linking of the second component to the first component; wherein the override enables specific adjustment of the second component such that the second component has one or more visual attributes that differ from one or more visual attributes of the first component. In some implementations, the method further includes, receiving an adjustment parameter that causes adjustment of a visual attribute of the first component; and based on the selection of the override, the adjustment parameter that adjusts the visual attribute of the first component does not cause adjustment of a visual attribute of the second component that is linked to the first component in the design system.

In some implementations, receiving the input for accessing the one or more control panels of the design system includes receiving a selection of at least one of: a color control panel; a shape control panel; a typography control panel; an iconography control panel; or an elevation control panel. In some implementations, the color control panel is configured to provide control functions for adjusting color attributes of each component in the set of visual components in the content theme; the shape control panel is configured to provide control functions for adjusting shape attributes of each component in the set of visual components in the content theme; and the typography control panel is configured to provide control functions for adjusting typography attributes of each component in the set of visual components in the content theme.

In some implementations, the iconography control panel is configured to provide control functions for adjusting iconography attributes of each component in the set of visual components in the content theme; and the elevation control panel is configured to provide control functions for adjusting elevation attributes of each component in the set of visual components in the content theme. In some implementations, the graphical content is created at least in response to selection of the first component and adjustment of one or more visual attributes of the first component based on the content theme.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. This document describes techniques for implementing an interface that has improved controls and component features for generating graphical content. For example, the described system can be integrated with existing design programs to enhance the design controls of the existing programs. The system provides a library of components that each have visual attributes that are more easily adjusted based on the enhanced controls. The system can integrate with existing design programs to facilitate dynamically adjusting visual attributes of component sets in the component library.

In some cases, components are automatically adjusted in manner that is specific or unique to each component so as to efficiently accomplish the complex task of applying different design systems across an entire set of components at once. A code generation engine of the system interacts with the component library to generate code that enables more streamlined design collaboration among multiple designers. Thus, the techniques discussed in this document can be implemented to provide a more efficient and effective user interface. The interface allows users to apply design themes that cause the system to automatically link and adjust attributes for a set of components without requiring users to use extraneous computing resources to manually adjust attributes of each component.

The techniques provide a repeatable automated process that reduces human intervention and does not require a user to adjust certain portions of graphical content or the manual creation of shared code to facilitate collaboration. The techniques enable computing systems to perform operations that the systems were previously unable to perform due to the challenges of effectively integrating design themes, component linking, and design collaboration in a design system. As such, the described technology improves the human-machine interface and the efficiency of the computer system operation, which is an improvement to the computer system itself.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
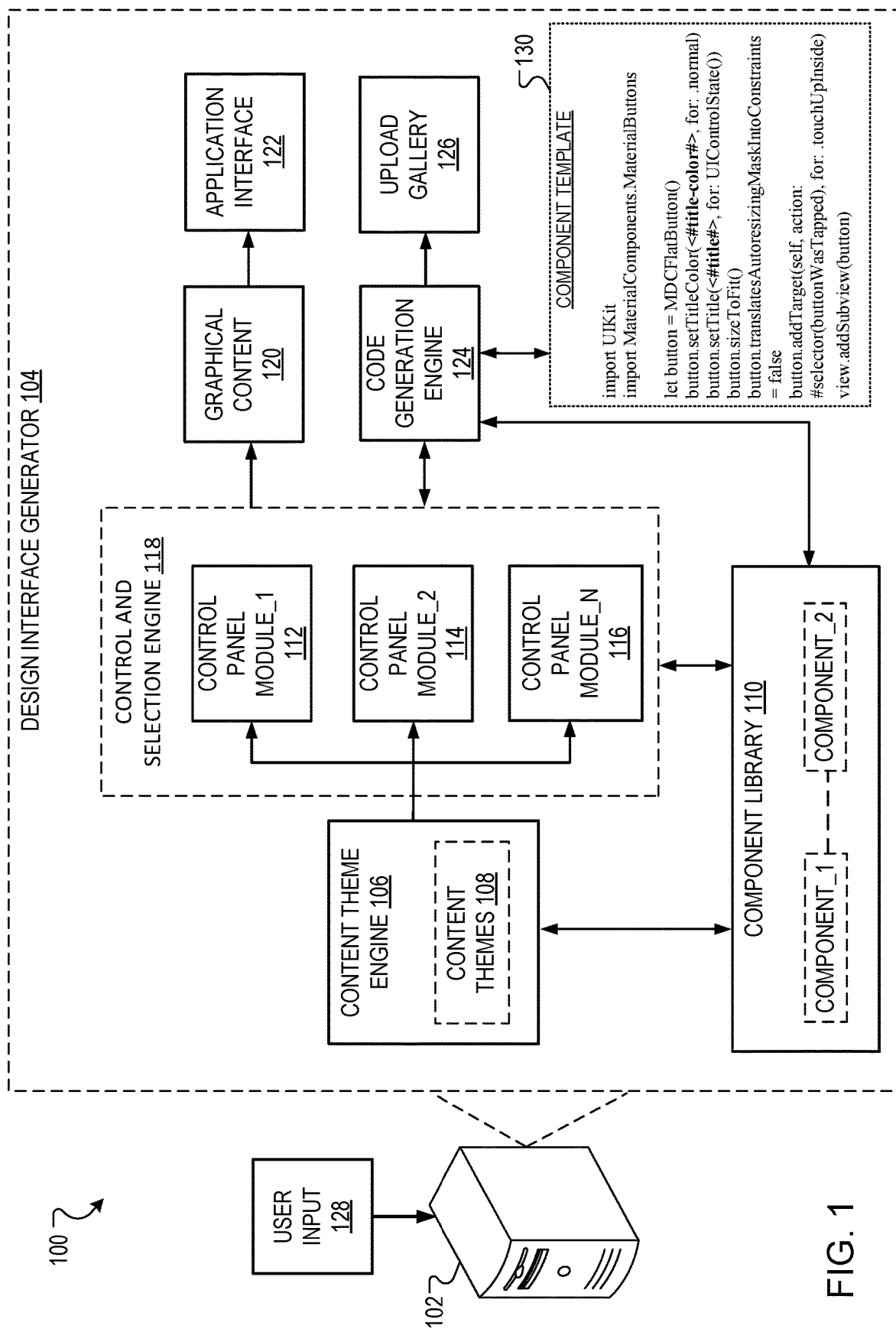
FIG. 1 is a block diagram of an example design system for creating graphical content.

This document describes techniques for implementing a system for creating user-specified graphical content. The system stores multiple predefined content themes and associates each content theme with components in a library of components. Components are accessed at a design interface to create graphical content based on a selected content theme. A content theme defines styles and layout characteristics for each component in a set of visual components included in the content theme. The design interface includes multiple design control panels. Each design control panel includes control functions that enable a user to customize different aspects of a user interface. The user interface can be an example graphical user interface (GUI) for an application (e.g., an "app") launched or executed at a mobile or client device, such as a smartphone or tablet device.

Each component in the library is formed from a set of symbols and has attributes that can be adjusted using control functions of a design control panel. For example, a design control panel can be configured to cause adjustment of one or more of a shape, color, typography, iconography, or elevation of a component or of a symbol or set of symbols that form and/or represent a component. The adjustments occur in response to the design system detecting user interaction with the control functions of the design control panel. The design control panel causes adjustment of visual attributes of the component based on control functions that are coded for the design control panel within the design system. The component library can be configured to store data that indicates links between particular components of one or more components such that an adjustment to a visual attribute of a first component causes a corresponding adjustment of a visual attribute of a second component.

In some implementations, the design interface includes a respective design control panel for each of shape, color, typography, iconography, and elevation. These items generally correspond to an attribute (e.g., a visual attribute) of a component. In this implementation, each of the multiple design control panels may represent a respective sub-system of the design system. Using the described techniques, various elements of a design of the GUI can be customized based on a brand or content theme that is specific to a particular user or designer.

Based upon the links between components, a user can modify one or more properties of components of a GUI without the user being required to modify each user interface component separately. The linking of components and use of links between components allows a GUI to be configured by a user in a simplified manner that requires fewer user inputs to achieve modification of the GUI. The linking of components can additionally allow associations between components to be set in a preliminary phase and subsequently used to allow subsequent modifications to be controlled and applied consistently, thereby allowing an improved output GUI to be generated. The data is therefore structured so as to allow the data to be modified efficiently. An improved user interface for configuring a GUI is therefore provided in which the configuration of the components allows fewer user interactions to configure the GUI.

To create graphical content for generating an interface for an application, the design system obtains a content theme from among the multiple predefined content themes stored at the system. In some implementations, the system obtains a content theme and automatically generates a data file that includes a set of visual components from among the components in the library. The set of visual components in the data file can each include baseline attributes that are specific to the obtained content theme. The set of visual components can each have a particular color attribute, shape attribute, icon design attribute, or other visual characteristic that is defined based on the styles and layout features of the content theme. For example, a component can be a substantially square virtual button with rounded edges that is opaque in appearance (or color) based on a style feature of the content theme. The system detects user input that interacts with a design control panel (e.g., a shape control panel) included in, or integrated at, the design interface. User input signals that represent the detected user interaction are processed by the design system to select a component or to adjust a visual attribute of the component to create graphical content.

In some implementations, the system is configured such that user input for adjusting a component affects visual attributes relating to edges or corners of the component, e.g., four corners of a substantially square virtual button. Alternatively, the system can detect or receive input(s) for selecting which corner or edge is affected by the adjustment and automatically apply the adjustment to the component, e.g., by adjusting edge roundness or an angled cut of one or multiple components. In some implementations, the system references a set of design guidelines for a content theme to determine a linking between at least two visual components. Based on the design guidelines and the determined linking, the system determines which components in a data file to adjust and the manner in which the adjustments are applied at least visually to each component. The system creates graphical content using the selected components and adjustments to visual attributes of the selected components. The graphical content can be used to generate a GUI for an application that is accessed and used at a client device.

FIG. 1 is a block diagram of an example design/computing system 100 for creating graphical content. Design system 100 includes a computing server 102 that executes programmed instructions for generating a graphical user interface that is provided for output at a display of an example computing device. The computing device (or computing server 102) can be any computer system or electronic device that communicates with a display device to present an interface to a user. For example, the electronic device can be a desktop computer, a laptop computer, a smartphone, a tablet device, a smart television, an electronic reader, an e-notebook device, a gaming console, a content streaming device, or any related system that is configured to receive user input via the display device. In some cases, the computing device integrates the display device within a housing of the computing device.

System 100 may further include multiple computers, computing servers, and other computing devices that each include processors or processing devices and memory that stores compute logic or software/computing instructions that are executable by the processors. In some implementations, multiple computers can form a cluster of computing nodes or multiple node clusters that are used to perform the computational and/or machine learning processes described herein.

Server 102 includes an interface generator 104 that is configured to generate a design interface, such as a graphical user interface ("GUI"). The design interface is provided for output at a display of the computing device. The design interface is configured such that a user (e.g., a designer) can use the design interface to create graphical content. For example, the user may be a designer that interacts with elements of the design interface to generate a specific type of graphical interface. The graphical interface is generated in part from graphical content the designer creates using the design interface. In some implementations, the graphical interface is an interface for: a webpage, a native application of an operating system or e-notebook device, or an application program (e.g., an "app") downloaded or installed at a smartphone or tablet computer.

Server 102 can be configured to include or access interface generator 104 and each of the multiple computing resources of interface generator 104. In some implementations, interface generator 104 is included within server 102 as a sub-system of hardware circuits having one or more processor microchips. In general, server 102 can include processors, memory, and data storage devices that collectively form one or more computing systems or modules of server 102. Processors of the computing systems process instructions for execution by server 102, including instructions stored in the memory or on the storage device to display graphical information for an example interface (e.g., a design interface) on a display of system 100 or on a display of a device that interacts with system 100.

Execution of the stored instructions can cause one or more of the actions described herein to be performed by server 102 or interface generator 104. In other implementations, multiple processors may be used, as appropriate, along with multiple memories and types of memory. For example, server 102 may be connected with multiple other computing devices, with each device performing portions of the actions or operations for the various processes or logical flows described in this specification. In some implementations, the multiple other computing devices can include one or more of a server bank, groups of servers, a cloud-based system, computing modules, or a multi-processor system.

Interface generator 104 includes a content theme engine 106 that accesses at least one of multiple content themes 108 that are stored at a storage device of system 100. A content theme defines styles and layout characteristics for each component in a set of visual components included in the content theme. In some implementations, a content theme is represented visually by a core state object in a downloadable application file (e.g., a plugin) installed on a computing device. The file is executed to launch or access an example design interface of system 100 that shows design canvas with graphical items that can be manipulated to create graphical content, such as text and images, on a website. The content theme (or core state object) can include a serialized representation of a content theme editor as well as derivative information (e.g., metadata or attribute tags) relating to each component at component library 110. In some cases, interface generator 104 uses the information to update component library 110 and to update a code generation engine 124 (described below) to produce styling code specific to a particular content theme.

System 100 can store multiple predefined content themes 108 and associate each content theme with one or more sets of visual components stored at a component library 110. Components are accessed at the design interface to create graphical content based on a selected content theme. Each component in the library has attributes that can be adjusted using control functions of a design control panel. In some implementations, at least two components can be linked such that changing an attribute of one component causes a corresponding change to an attribute of another component. For example, a first component (component_1) in component library 110 is linked with a second component (component_2) in component library 110. In this manner, a change to, for example, an attribute such as the shape or color of component_1 causes a corresponding change to the shape or color of component_2.

Control and selection engine 118 includes one or more design/control panel modules. Each control panel module corresponds to a control panel that may be integrated at the design interface. For example, a control panel module 112 can be used to generate a graphical interface for an iconography control panel having one or more control functions. The control functions of the iconography control panel are used to adjust icon style attributes of a component (described below). Similarly, a control panel module 114 can be used to generate an example graphical interface for an elevation control panel having one or more control functions. The control functions of the elevation control panel are used to adjust elevation attributes of a component (described below).

Control panel module 116 (module_N) can be used to generate an example graphical interface for at least one of multiple other control panels that each have their own respective control functions. Each of the other control panels can be used to adjust visual attributes relating to one of a shape, a typography, or a color of a component. An example design interface can include N number of control panels, where N is an integer greater than one. In some implementations, each control panel module 112, 114, 116 is associated with a subdirectory of the control and selection engine 118 that includes programmed code or software instructions necessary to render a design or application panel of the design interface.

Graphical content 120 corresponds to visual information used to generate an example application interface 122. System 100 uses control and selection engine 118 to detect user input 128 that interacts with a control panel (e.g., a shape control panel) included in, or integrated at, the design interface. Signals corresponding to the user input 128 are processed by control and selection engine 118 to adjust at least one visual attribute of a component. In some implementations, system 100 generates an example application interface for output at a display of a computing device. For example, the application interface can include representations of the graphical content 120 and is generated based on adjusted visual attributes of components in the component library 110 of system 100.

Interface generator 104 can include a code generation engine 124 that is configured to generate program code based on components in graphical content 120. The program code corresponds to design code that can be uploaded to an example upload gallery 126. Code generation engine 124 can be configured to convert components that form graphical content 120 to design code. The design code enables collaboration among two or more designers or users of system 100. For example, code generation engine 124 can access an example component template that is added or attached to data for each component published at component library 110. Interface generator 104 can publish data for a component at library 104 and generate a component template 130 in response to publishing the data for the component. In some implementations, an example data structure of the component library 110 derives information for a component from the component template 130. The data structure can be used by system 100 to facilitate a linking between two or more components. In some cases, at least two components can be linked (e.g., using the data structure) based one or more specific attributes of each component.

In some implementations, system 100 causes an existing component template to be modified or a new component template to be generated as part of a component update process that occurs when a user adjusts one or more attributes of a component. In some implementations, code generation engine 124 uses instructions or pseudo code in a template 130 to generate the program code. The program code can be uploaded to gallery 126 to enable or facilitate collaboration among multiple designers. In this manner, gallery 126 can use the program code that is uploaded to access data (e.g., metadata) for each component published at component library 110. Using gallery 126, a member of a design team can communicate to other team members about which components have been used in an example mock interface, or how the components have been customized.

Figure 2:
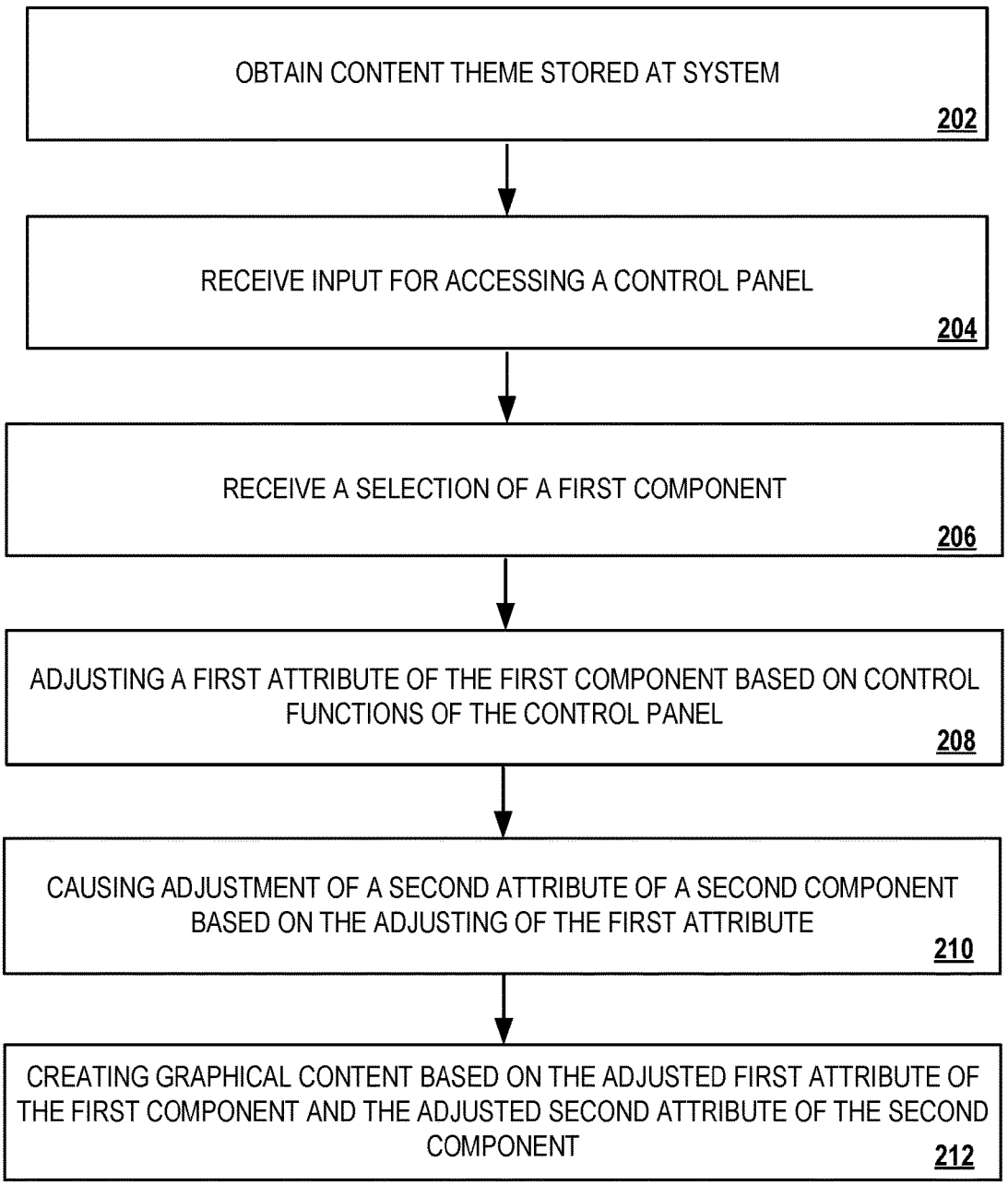
FIG. 2 is a flowchart of an example process for creating graphical content.

FIG. 2 is a flowchart of an example process for creating graphical content. Process 200 can be performed using the systems described in this document. Descriptions of process 200 may reference one or more of the above-mentioned computing resources of system 100. In some implementations, steps of process 200 are enabled by programmed instructions that are executable by processors of the devices and systems described in this document.

Referring now to process 200, system 100 obtains a content theme from among multiple predefined content themes stored at the design system (202). Each predefined content theme includes a set of visual components. For example, system 100 obtains a content theme and automatically generates a data file that includes a set of visual components from among the components in the component library 110. An example design interface receives input for accessing design control panels of the design system (204). In some implementations, the design interface receives a selection of a first control panel (e.g., elevation control panel) that provides control functions configured to adjust one or more visual attributes of the first component. Control panels of system 100 are each configured to provide control functions for adjusting attributes of the set of visual components in the content theme. As discussed, system 100 can reference a set of design guidelines for a content theme to determine how at least two visual components are linked in component library 110 and to determine which component attributes to adjust as well as the manner in which the adjustments are applied at least visually to each component. The control panels can be specifically designed to enable users to follow design requirements in a set of design guidelines. In some implementations, existing control panels are updated as design guidelines change over time, and new control panels can be added at a control interface of system 100. The new control panels can be configured to provide further control options to users that enable other customizations for components as system 100 expands.

A control panel receives a selection of a first component from among the set of visual components in the content theme (206). In some implementations, system 100 is configured so that a user can place components from one or multiple different component libraries into their own graphical content 120 for manipulation or adjustment at an example design or control interface. The graphical content 120 may correspond to a mock representation of an application interface 122. Components in library 110 of system 100 can include metadata that is recognizable by the system 100. Hence, when a user selects a relevant component, the design interface is configured to automatically display relevant information about the selected component as well as data describing links between the selected component and other components in the library.

A first component selected from among the set of visual components is linked to at least a second component in the set of visual components stored at the design system. In response to detecting user interaction with the control panels, the design system 100 adjusts a first visual attribute of the first component based on the control functions of a control panel with which the user interaction occurred (208). For example, system 100 adjusts the one or more visual attributes of the first component in response to receiving an adjustment parameter. The adjustment parameter is received and processed in response to detecting user interaction with the first control panel that triggers the control functions of the first control panel.

The first design control panel can receive a selection of the second component to create graphical content 120 for output at a display of a computing device. In some implementations, interface generator 104 automatically adjusts the selected second component to have one or more visual attributes that match the adjusted one or more visual attributes of the first component. The second component is automatically adjusted based on the second component being linked to the first component. For example, if the first component is a "tap me" button at a particular component page and that is adjusted to have the color blue, then a corresponding "read me" button at another component page that is linked to the "tap me" button is automatically adjusted to have the color blue. In some cases, adjustment choices users make are immediately reflected in the component library 110, as components (or symbols of components) change to match the control or adjustment decisions made by users. Hence, not all components are affected by all adjustment choices. Components can change in different ways depending on the definitions and adjustment requirements in the design guidelines. For example, a primary color selected using a color control panel may only affect some components, while selection of a secondary color affect others components.

In some implementations, the second component is automatically adjusted in a manner that is unique to the second component based on the adjusted one or more visual attributes of the first component. For example, a "tap me" button can be a first component that is linked to a component page that represents a second component. Adjusting an elevation or shape attribute of the "tap me" button causes that component page to be automatically adjusted in a manner that is unique or specific to the component page based on the adjusted elevation and shape of the "tap me" button. For example, the component page can have specific changes that are applied in a manner that is unique to only the component page, such as automatically resizing text displayed at the page or adjusting one or more typography attributes of different content displayed at the component page.

Design system 100 causes an adjustment of a second visual attribute of a second component based on the adjusting of the first visual attribute of the first component because of the second component being linked to the first component in the design system (210). System 100 creates graphical content for output at a display of a computing device (212). The graphical content is created based on the adjusted first visual attribute of the first component and the adjusted second visual attribute of the second component that occurred because the second component is linked to the first component in the design system.

As discussed above, the component library can be configured to link one or more components such that an adjustment to a visual attribute of a first component causes a corresponding adjustment of a visual attribute of a second component. Each control module 112, 114, 116 includes one or more overrides that are available to a user. In some implementations, users can assign linking overrides to symbol and component instances. The override disables a link between at least two components and allows users to apply a specific alternative style or adjustment to visual attributes of a single component. In some cases, the alternative styles remain within the confines of a particular selected theme. Once saved, an entire component library in that particular theme is available for use.

The system generates an application interface for output at a display of a computing device. For example, the interface can be an example graphical interface for an app such as a gaming app or an online shopping app for use on a smartphone. The application interface includes representations of the graphical content and is generated based on adjusted visual attributes of one or more components in the set of visual components in the system.

System 100 is configured so that a user can generate program code for a design component for multiple different design programs or design component platforms. In some implementations, the gallery 126 allows users, including members of a design team, to view and comment on one or more shared mocks of a graphical interface. For example, gallery 126 can analyze information such as metadata tags for a component or pseudo code of a component template 130 to display relevant information about a component to users of system 100. Gallery 126 is configured to allow one or more users to download design assets from interactive graphical content 120 corresponding to code generated by code generation engine 120.

Hence, system 100 enables sharing of design assets between two or more users. For example, a designer can share graphical content (e.g., mocks) for an example application interface 122. In some cases, mocks are shared with one or more users in a design team, where sharing the mocks can include sharing annotations such as redlines, typography, and color. In some implementations, a designer can share specific information about components that are used in their mocks. The information can be used by other team members, designers, and engineers to improve or adjust their designs. The information can also identify which components have been used in a mock design as well as how the components have been customized.

A user can create and save a library of customized symbols and components and share, e.g., via uploading generated code to gallery 126, the created library with their design team. In some implementations, customized component libraries can also be edited and synced between design team members. The libraries may be edited or synced in various ways based on the types of professional design tools that are used by the team members to communicate and interact with control features of system 100. System 100 allows users to insert components or symbols from a shared or customized component library 110 into their design canvas, such as a digital artboard used to create graphical content. In this manner, the various control panels and other computing resources of system 100 allow users to create cohesive designs that follow a single (or multiple) design system(s) that the user defines based on a particular set of design guidelines.

Component library 110 can be configured to embed metadata into all components and symbols of components created and/or stored at system 100. The metadata can indicate which component, or set of components, a particular symbol represents. For example, a symbol can represent a portion (e.g., curved section or corner) of a button displayed at a component page or a particular component page in a set of linked component pages. The metadata can also provide details describing how a component was customized by a user, such as how the color, typography, shape, iconography, or elevation was customized. In some implementations, the metadata is saved as part of symbols and components of system 100 and is included in a data file (e.g., program code generated by engine 124) that corresponds to a digital artboard used by a designer.

System 100 enables users to share mock interfaces or digital artboards with team members using one or more professional tools of system 100 (e.g., gallery 126). The tools are configured to read metadata embedded or included in the digital art board and present any existing, new, or customized component specific information to team members. Based on the configured features of gallery 126, team members are not only able to see and interact with mocks that were created, but the members are also able to inspect the components and symbols included in the mocks, see which component(s) a symbol represents, and which customizations were defined as part of this process.

FIG. 3A-3E each show an example control panel for creating graphical content. Each of the control panels can be integrated in an example design interface generated by interface generator 104. As discussed above, a user can adjust visual attributes of a component using the control functions of an example control panel. In some implementations, each component at component library 110 has a set of parameters and corresponding parameter values for defining features and attributes of a component. User interaction with a control panel to adjust a parameter value provides a way in which visual attributes of the component can be adjusted or customized. In some cases, adjusting parameters (or parameter values) allows a user to create their own versions of particular components that can be stored and accessed at component library 110.

Figure 3A:
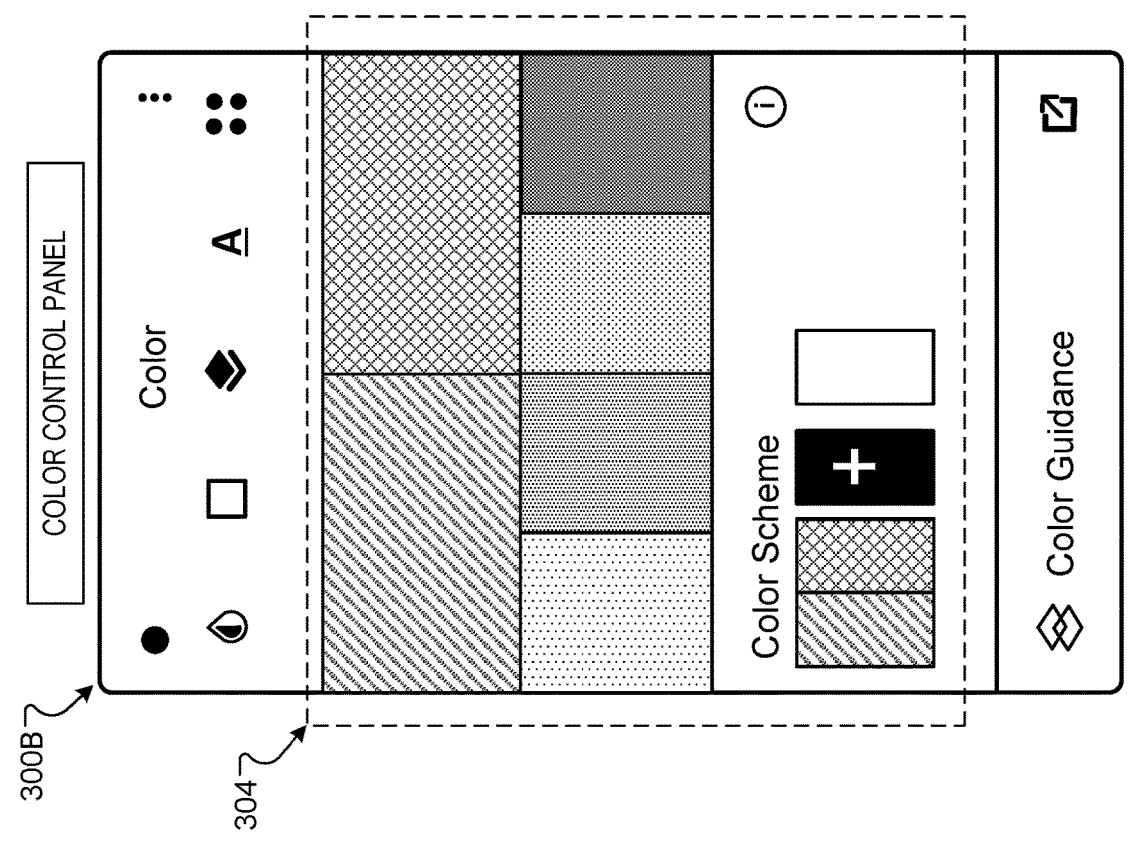
FIG. 3A-3E each show an example design control panel for creating graphical content.

FIG. 3A shows an iconography control panel 300A that includes control functions 302 for adjusting one or more icon style attributes of a component. Iconography control panel 300A is configured to allow users to apply an icon style to a set of icon symbols that are included in components. In some implementations, iconography control panel 300A allows users to choose from multiple predefined icon styles. For example, different icon styles can be selected and applied to components with visual attributes that are based on a selected content theme. The icon styles that can be selected include a basic style, a rounded style, a sharp style, an outline style, and a two-toned style. A design/control panel module 112, 114, or 116 (described above) is used to generate the graphical interface for the iconography control panel 300A having the control functions 302. For example, a control panel module 116 is associated with a subdirectory of the control and selection engine 118 and includes programmed code or software instructions necessary to render the visual elements of iconography control panel 300A.

The design system 100 can adjust a visual attribute of a component in response to detecting user interaction with the iconography control panel 300A. For example, the user interaction with control functions 302 causes an icon style attribute of components (or symbols) to be adjusted, e.g., from basic style to sharp style. In some implementations, the 100 system receives a selection of an override configured to modify a linking of a second component to a first component. In general, the override enables specific adjustment of the second component such that the second component has one or more visual attributes that differ from one or more visual attributes of the first component. In some cases, system 100 receives an adjustment parameter that causes adjustment of a visual attribute of the first component. Based on the selection of the override, the adjustment parameter that adjusts the visual attribute of the first component does not cause adjustment of a visual attribute of the second component that is linked to the first component in the design system.

Figure 3B:
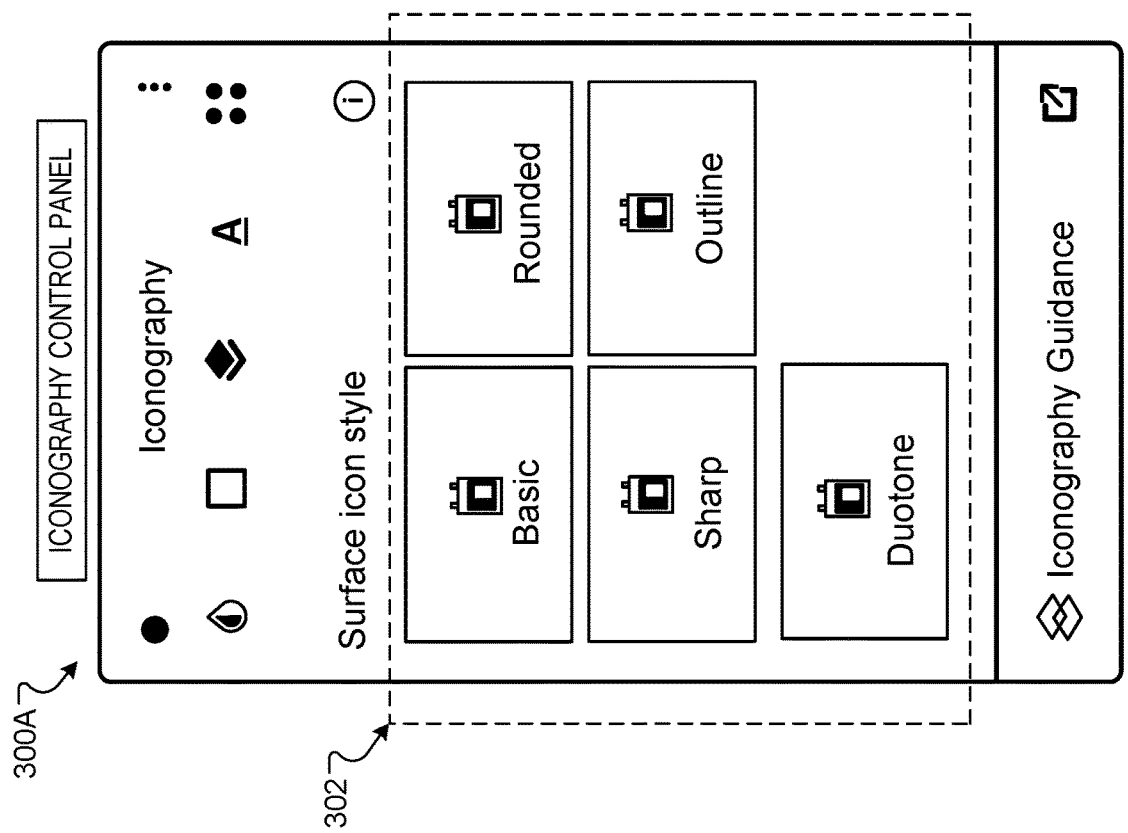

FIG. 3B shows a color control panel 300B that includes control functions 304 for adjusting one or more color attributes of a component. In general, color control functions 304 can be used to create an example color theme that reflects a designer's style brand or style. For example, color control panel 300B is configured to allow users to choose "primary" and "secondary" colors that are associated with visual attributes of a component.

In some implementations, coded scripts are executed by a control module of system 100 to change various colors attributes for all relevant symbols that form components stored in the component library 110. In some cases, color control panel 300B is configured so that only particular parts or symbols of a component will change color in response to user interaction with control functions 304, thereby reflecting the afforded flexibility that can be defined by the design guidelines of system 100. A design/control panel module 112, 114, or 116 (described above) is used to generate the graphical interface for the color control panel 300B having the control functions 304. For example, a control panel module 116 is associated with a subdirectory of the control and selection engine 118 and includes programmed code or software instructions necessary to render the visual elements of color control panel 300B.

Figure 3D:
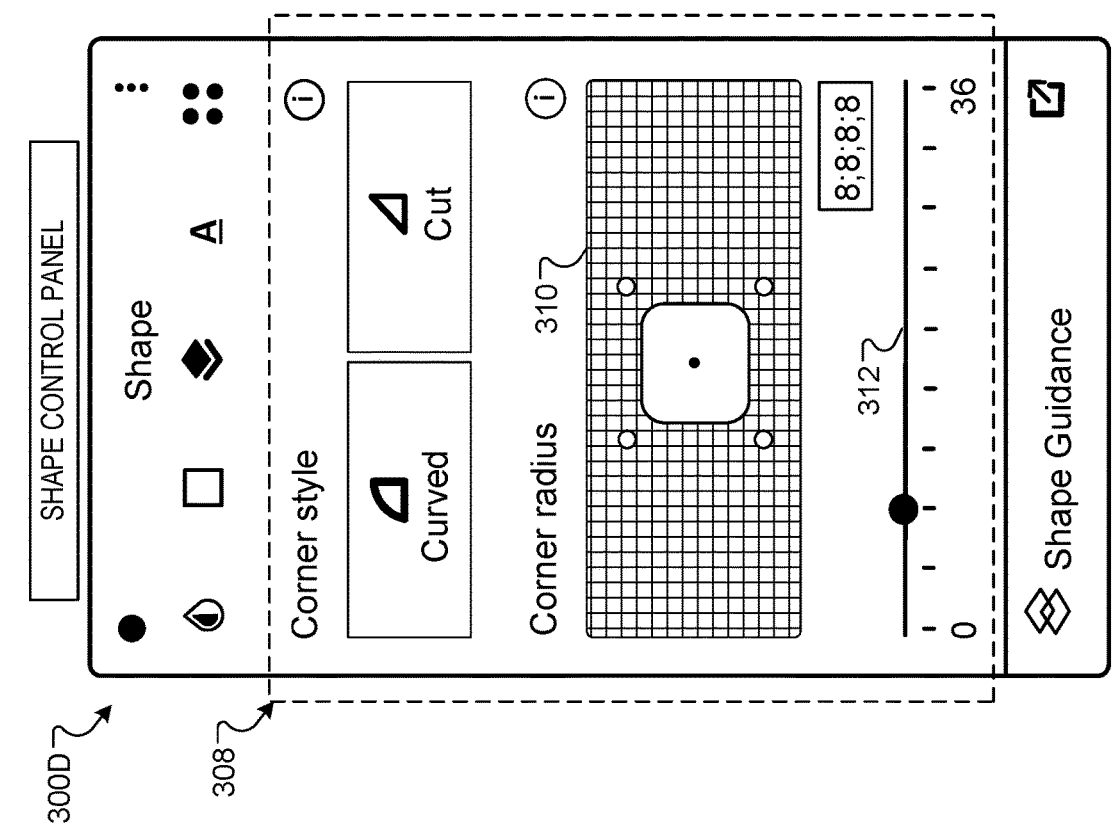
Figure 3C:
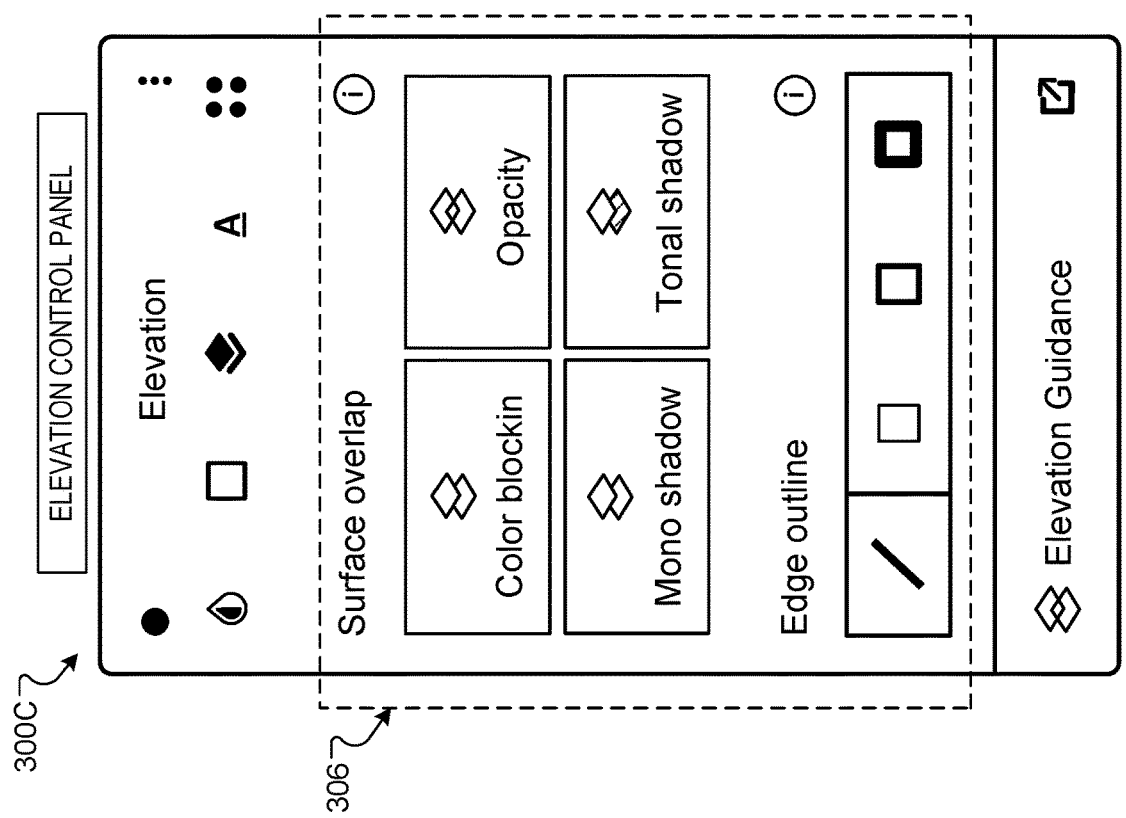

FIG. 3C shows an elevation control panel 300C that includes control functions 306 for adjusting one or more elevation attributes of a component. The elevation control panel 300C allows a user to select an elevation style to apply globally across a set of components. For example, a user can interact with a control functions select to show elevation using shadow attributes of a component. In some implementations, a visual shadow attribute and a stroke attribute is used as a stylistic choice to show an elevation style. If a user selects or interacts with a control function 306 to show elevation via stroke (or fill), then stroke (or fill), then system 100 can automatically select to consistently show elevation in this manner for a variety of other components. In some implementations, if a user does not use shadows to show elevation, then a component fill and/or component stroke can be combined with a visual transparency attribute of a component. In general, surface types, such as solid, stroked, or transparent surface types can be generated and applied to a set of components in different ways to adjust elevation of the components.

Elevation controls enabled by control functions 306 can be applied globally and can be proportionally linked across at least two components in component library 110. In some implementations, adjusting elevation intensity affects the at least two components in a set of components. Elevation control panel 300C includes interface features that show visual data to users indicating how different elevation strategies affect visual attributes for a set of components. A design/control panel module 112, 114, or 116 (described above) is used to generate the graphical interface for the elevation control panel 300C having the control functions 306. For example, a control panel module 116 is associated with a subdirectory of the control and selection engine 118 and includes programmed instructions necessary to render the visual elements of elevation control panel 300C.

Control functions 306 can enable a user to select a desired surface separation technique that can be applied to a component. For example, users can select from among several techniques for adjusting elevation that enable a user to do the following: i) apply a shadow to a component (e.g., a monochromatic or tonal shadow); ii) turn on shadow or turn off shadow; iii) when shadow is turned off, then automatically turn off edge outlines; iv) cause a component surface to be solid or transparent; v) when shadow is turned off, automatically inform a user is to use edge outlines or transparency to delineate surfaces; and vi) when tonal shadow is applied, automatically inform the user that colorized surfaces inherit tonal shadow.

Control functions 306 can enable a user to select from among other separation techniques for adjusting elevation that enable a user to do the following: i) apply a visual transparent or opacity surface type, including color blocking and occlusion; ii) when shadow is turned on, then a component surface type can be solid by default and transparency adjustments may, or may not, be provided as a control option at control panel 300C; ii) when shadow is turned off, then a surface can be solid or transparent; iii) transparent surface attributes can be configured to affect only certain components and has a defined scale based on usability of the transparency for a particular component; and iv) when edge outlines are turned on, then a surface type attribute of a component can be solid or transparent.

Control functions 306 can enable a user to control a manner in which edge outlines are applied or adjusted for a component. In some implementations, the controls are configured such that users can apply edge outlines in combination with, or on top of, surface separation techniques to adjust elevation. For example, control functions 306 enable a user to: i) add or adjust stroke thickness for certain edge outlines; and ii) apply a stroke width uniformly across components and does not change based on the scale of a component. In some cases, a stroke can change based on a component state.

Control functions 306 can enable a user to: i) control a manner in which elevation relationships are applied or adjusted for at least two components (e.g., two linked components); ii) control how shadow intensity is applied or adjusted for a component; iii) control or adjust isometric views of a component; and iv) select or use one or more predefined elevation styles that can be access at elevation control panel 300C. In some implementations, control functions 306 are used to modify or adjust elevation characteristics and parameter values (e.g., for controlling baseline shadows of a component).

For example, the controls can be used to adjust elevation height of a selected component or set of components, such as a resting elevation height or a raised elevation height of the component. The controls can also be used to adjust a primary or ambient shadow across a set of shadow symbols that form a component, e.g., to create more subtle or more dramatic visual shadow attributes. Elevation control panel 300C can provide interactive isometric views (e.g., in z-space) of a component to show a mock or a preview of component positions and elevation changes applied to the component. In some implementations, isometric views are used to adjust, or correct, elevation relationships among two or more components (e.g., to correct an elevation discrepancy between the components).

FIG. 3D shows a shape control panel 300D that includes control functions 308 for adjusting one or more shape attributes of a component that correspond to a visual shape, style, or geometric feature of the component. For example, shape control panel 300D is configured to allow users to choose at least between round, curved, or cut corners, as well as which corners are affected when user seeks to adjust the shape of a component and at what intensity. In some implementations, coded scripts are executed by a control module of system 100 to change various shape attributes (e.g., corner radius) for all relevant symbols that form components stored in the component library 110. In some cases, shape control panel 300D is configured so that only particular parts of components will change shape (and at varying intensity) in response to user interaction with control functions 308, thereby reflecting the afforded flexibility that can be defined by the design guidelines of system 100.

A design/control panel module 112, 114, or 116 (described above) is used to generate the graphical interface for the shape control panel 300D having the control functions 308. For example, a control panel module 116 is associated with a subdirectory of the control and selection engine 118 and includes programmed instructions necessary to render the visual elements of shape control panel 300D. In some implementations, shape control panel 300D includes an interactive visual grid 310 and a numerical sliding scale 312 that each provide controls for adjusting a corner radius or for adjusting other visual attributes of components stored in component library 110.

Figure 3E:
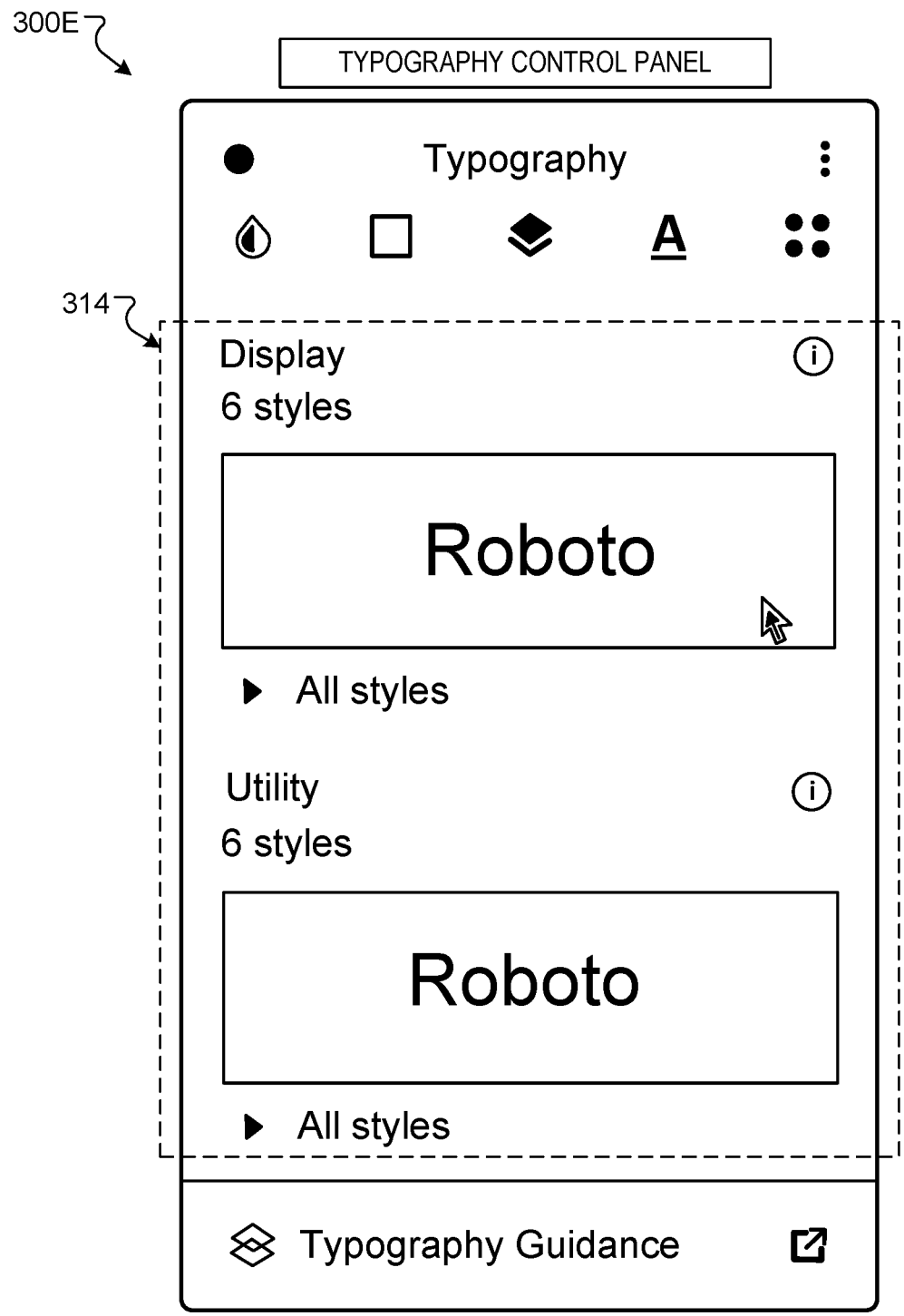

FIG. 3E shows a typography control panel 300E that includes control functions 314 for adjusting one or more visual attributes of a component that correspond to a visual display or font style for letters, numbers, or characters of the component. The typography control panel 300E is configured to allow users to choose multiple (e.g., at least three) fonts and to define a "Type Scale" by automatically calculating font sizes.

In some implementations, coded scripts are executed by a control module of system 100 to change various fonts or typography attributes (e.g., display style or utility style) for all relevant symbols that form components stored in the component library 110. In some cases, typography control panel 300E is configured so that only particular parts of components will have their respective typography attributes adjusted in response to user interaction with control functions 314, thereby reflecting the afforded flexibility that can be defined by the design guidelines of system 100.

The typography control panel 300E can enable users to create an example type set, download fonts, and generate desired type styles. For example, users can select from multiple predefined type pairings based on a particular content theme that includes curated sets or users can create their own type pairings using a set of fonts that may be available from other design resources. In some implementations, control logic for typography control panel 300E is configured such that a typography size for each type style is automatically adjusted so that a particular type style fits within component typography containers. In some cases, using the control functions 314, a user can create a typeset by selecting a typeface from among available fonts included at the control panel 300E, visually preview how a particular typeset is applied to a component, check accessibility of the text with respect a corresponding component, and download one or more fonts used in a typeset.

A design/control panel module 112, 114, or 116 (described above) is used to generate the graphical interface for the typography control panel 300E having the control functions 314. For example, a control panel module 116 is associated with a subdirectory of the control and selection engine 118 and includes programmed instructions necessary to render the visual elements of typography control panel 300E.

Figure 4:
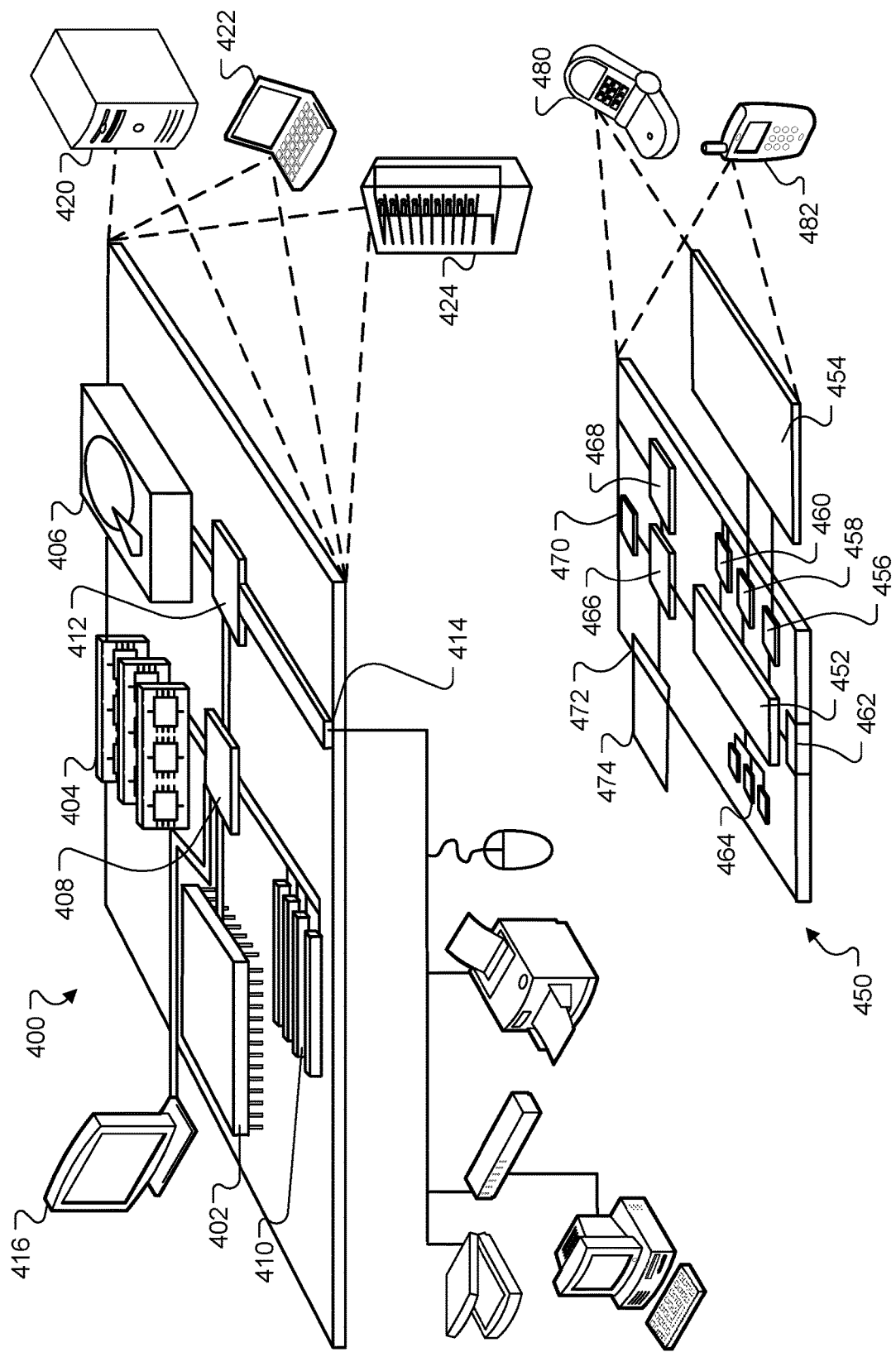
FIG. 4 is a block diagram of an example computing system that can be used in connection with methods described in this specification.

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As discussed above, systems and techniques described herein can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method performed using a system that provides an interface for creating user-specified graphical content, the method comprising:
   obtaining a content theme from among a plurality of predefined content themes stored at the system, wherein each predefined content theme includes a set of visual components;
   receiving, at the interface, input for accessing one or more control panels of the system, the one or more control panels each configured to provide control functions that adjust attributes of the set of visual components in the content theme;
   receiving, at the one or more control panels, a selection of a first component from among the set of visual components in the content theme, wherein the first component selected from among the set of visual components is linked to at least one additional component in the set of visual components;
   in response to detecting user interaction with the one or more control panels, adjusting a first visual attribute of the first component based on the control functions of the one or more control panels with which the user interaction occurred;
   in response to adjusting the first visual attribute of the first component, identifying, based on the adjustment made to the first visual attribute and a respective adjustment definition for each visual component in the set of visual components, one or more second components of the set of visual components to adjust in response to the adjustment made to the first visual attribute;
   for each of the one or more second components,
      determining, based on the adjusted first visual attribute and the respective adjustment definition for the second component, a respective adjustment to a second visual attribute of the second component; and
      causing an adjustment of the second visual attribute of the second component linked to the first component based on the determined adjustment to the second visual attribute of the second component; and
   creating graphical content that is output at a display of a device, wherein the graphical content is created based on the adjusted first visual attribute of the first component and the adjusted second visual attribute of each second component.

2. The method of claim 1, further comprising:
generating an application interface that is output at the display of the device, wherein the application interface comprises representations of the graphical content and is generated based on adjusted visual attributes of one or more components in the set of visual components in the system.

3. The method of claim 1, further comprising:
receiving a selection of a first control panel that provides control functions configured to adjust one or more visual attributes of the first component; and
adjusting the one or more visual attributes of the first component in response to receiving an adjustment parameter after detecting user interaction with the first control panel that triggers the control functions of the first control panel.

4. The method of claim 3, further comprising:
receiving, at the first control panel, a selection of a given second component to create the graphical content that is output at the display of the device; and
automatically adjusting the given second component to have one or more visual attributes that match the adjusted one or more visual attributes of the first component,
wherein the given second component is automatically adjusted based on the given second component being linked to the first component.

5. The method of claim 3, further comprising:
receiving, at the first control panel, a selection of a given second component to create the graphical content that is output at the display of the device; and
automatically adjusting the given second component in a manner that is unique to the given second component based on the adjusted one or more visual attributes of the first component,
wherein the given second component is automatically adjusted based on the given second component being linked to the first component.

6. The method of claim 5, further comprising:
receiving, at the system, a selection of an override configured to modify a linking of the given second component to the first component;
wherein the override enables specific adjustment of the given second component such that the given second component has one or more visual attributes that differ from one or more visual attributes of the first component.

7. The method of claim 6, further comprising:
receiving an adjustment parameter that causes adjustment of a visual attribute of the first component; and
based on the selection of the override, the adjustment parameter that adjusts the visual attribute of the first component does not cause adjustment of a visual attribute of the given second component that is linked to the first component in the design system.

8. The method of claim 1, wherein receiving the input for accessing the one or more control panels of the design system comprises receiving a selection of at least one of:
a color control panel;
a shape control panel;
a typography control panel;
an iconography control panel; or
an elevation control panel.

9. The method of claim 8, wherein:
the color control panel is configured to provide control functions that adjust color attributes of each component in the set of visual components in the content theme;
the shape control panel is configured to provide control functions that adjust shape attributes of each component in the set of visual components in the content theme;
the typography control panel is configured to provide control functions that adjust typography attributes of each component in the set of visual components in the content theme,
the iconography control panel is configured to provide control functions that adjust iconography attributes of each component in the set of visual components in the content theme; and
the elevation control panel is configured to provide control functions that adjust elevation attributes of each component in the set of visual components in the content theme.

10. The method of claim 1, further comprising identifying, based on the adjustment made to the first visual attribute and the respective adjustment definition for each visual component in the set of visual components, one or more third components of the set of visual components of the predefined content theme that are not adjusted in response to adjusting the first visual attribute.

11. The method of claim 1, wherein the respective adjustment to the second visual attribute of the second component is different from the respective adjustment to the second visual attribute of at least one other second visual component.

12. A system that provides an interface for generating representations of user-specified graphical content, the system comprising:
one or more processing devices; and
one or more non-transitory machine-readable storage devices storing instructions that are executable by the one or more processing devices to cause performance of operations comprising:
obtaining a content theme from among a plurality of predefined content themes stored at the system, wherein each predefined content theme includes a set of visual components;
receiving, at the interface, input for accessing one or more control panels of the system, the one or more control panels each configured to provide control functions that adjust attributes of the set of visual components in the content theme;
receiving, at the one or more control panels, a selection of a first component from among the set of visual components in the content theme, wherein the first component selected from among the set of visual components is linked to at least one second component in the set of visual components;
in response to detecting user interaction with the one or more control panels, adjusting a first visual attribute of the first component based on the control functions of the one or more control panels with which the user interaction occurred;
in response to adjusting the first visual attribute of the first component, identifying, based on the adjustment made to the first visual attribute and a respective adjustment definition for each visual component in the set of visual components, one or more second components of the set of visual components to adjust in response to the adjustment made to the first visual attribute;
for each of the one or more second components,
determining, based on the adjusted first visual attribute and the respective adjustment definition for the second component, a respective adjustment to a second visual attribute of the second component; and
causing an adjustment of the second visual attribute of the second component of the at least one second components linked to the first component based on the adjusting of the determined adjustment to the second visual attribute of the first second component; and
creating graphical content that is output at a display of a device, wherein the graphical content is created based on the adjusted first visual attribute of the first component and the adjusted second visual attribute of each second component.

13. The system of claim 12, wherein the operations further comprise:
generating an application interface that is output at the display of the device, wherein the application interface comprises representations of the graphical content and is generated based on adjusted visual attributes of one or more components in the set of visual components in the system.

14. The system of claim 12, wherein the operations further comprise:
receiving a selection of a first control panel that provides control functions configured to adjust one or more visual attributes of the first component; and
adjusting the one or more visual attributes of the first component in response to receiving an adjustment parameter after detecting user interaction with the first control panel that triggers the control functions of the first control panel.

15. The system of claim 14, wherein the operations further comprise:

receiving, at the first control panel, a selection of a given second component to create the graphical content that is output at the display of the device; and automatically adjusting the given second component to have one or more visual attributes that match the adjusted one or more visual attributes of the first component, wherein the given second component is automatically adjusted based on the given second component being linked to the first component.

16. The system of claim 14, wherein the operations further comprise:

receiving, at the first control panel, a selection of a given second component to create the graphical content that is output at the display of the device; and automatically adjusting the given second component in a manner that is unique to the given second component based on the adjusted one or more visual attributes of the first component, wherein the given second component is automatically adjusted based on the given second component being linked to the first component.

17. The system of claim 16, wherein the operations further comprise:

receiving, at the system, a selection of an override configured to modify a linking of the given second component to the first component;

wherein the override enables specific adjustment of the given second component such that the given second component has one or more visual attributes that differ from one or more visual attributes of the first component.

18. The system of claim 17, wherein the operations further comprise:

receiving an adjustment parameter that causes adjustment of a visual attribute of the first component; and based on the selection of the override, the adjustment parameter that adjusts the visual attribute of the first component does not cause adjustment of a visual attribute of the given second component that is linked to the first component in the design system.

19. The system of claim 12, wherein receiving the input for accessing the one or more control panels of the system comprises receiving a selection of at least one of:

a color control panel;
a shape control panel;
a typography control panel;
an iconography control panel; or
an elevation control panel.

20. The system of claim 19, wherein:

the iconography control panel is configured to provide control functions that adjust iconography attributes of each component in the set of visual components in the content theme; and the elevation control panel is configured to provide control functions that adjust elevation attributes of each component in the set of visual components in the content theme.

* * * * *